United States Patent [19]

Cull

[11] 4,233,184
[45] Nov. 11, 1980

[54] ALUMINUM PHOSPHATE-ALUMINA COMPOSITIONS AND CATALYSTS COMPRISING THE SAME

[75] Inventor: Neville L. Cull, Baker, La.

[73] Assignee: Exxon Research & Engineering Co., Florham Park, N.J.

[21] Appl. No.: 4,456

[22] Filed: Jan. 18, 1979

[51] Int. Cl.³ .................. B01J 27/14; B01J 31/12
[52] U.S. Cl. .................. 252/437; 252/431 P
[58] Field of Search .................. 252/437, 431 P

[56] References Cited

U.S. PATENT DOCUMENTS

| | | | |
|---|---|---|---|
| 3,342,750 | 9/1967 | Kearby | 252/437 |
| 3,427,257 | 2/1969 | Bayer et al. | 252/431 P |
| 3,649,523 | 3/1972 | Bertolicini et al. | 252/437 |
| 3,904,550 | 9/1975 | Pine | 252/437 |
| 4,066,572 | 1/1978 | Choca | 252/437 |

FOREIGN PATENT DOCUMENTS 4630705 of 1968 Japan .................. 252/431 P

Primary Examiner—Delbert E. Gantz
Assistant Examiner—William G. Wright
Attorney, Agent, or Firm—Marthe L. Gibbons

[57] ABSTRACT

High surface area aluminum phosphate-alumina compositions are prepared by reaction of a mixture comprising an aluminum alkoxide and an organic phosphate such as trialkyl or triaryl phosphate, in the presence of moist air to form a precipitate, separating the precipitate from the mixture, drying and calcining the precipitate and recovering a high surface area aluminum phosphate-alumina product which can be used as catalyst support or catalyst component, especially for hydrocarbon treating and conversion processes.

26 Claims, 1 Drawing Figure

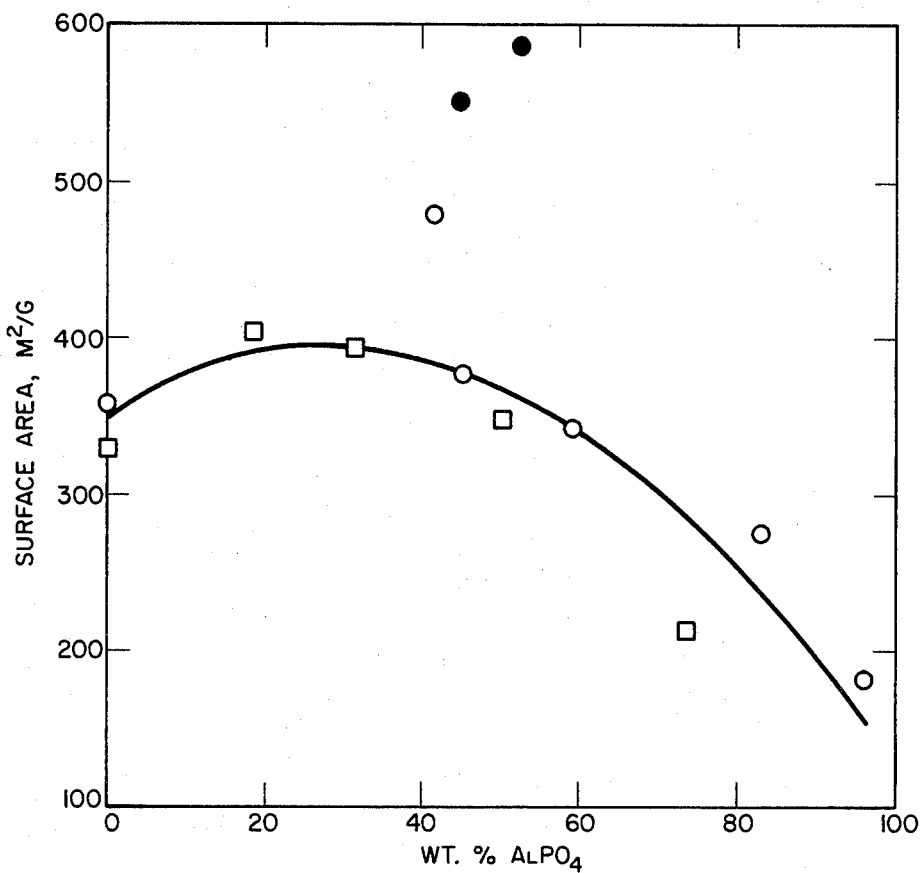

ALUMINUM PHOSPHATE-ALUMINA COMPOSITIONS AND CATALYSTS COMPRISING THE SAME

BACKGROUND OF THE INVENTION

1. Field of the Invention

The present invention relates to the preparation of aluminum phosphate-alumina compositions useful as catalyst supports and catalysts comprising the aluminum phosphate-alumina compositions.

2. Description of the Prior Art

It is known to prepare aluminum phosphate-alumina compositions by various methods. Catalysts comprising aluminum phosphate-alumina s a catalyst support or catalyst component are known.

U.S. Pat. No. 3,904,550 discloses a process for the preparation of an aluminum phosphate-alumina which comprises reacting an aluminum alkoxide with an aqueous solution of a phosphorus-containing acid such as phosphoric acid or a soluble salt thereof.

U.S. Pat. Nos. 3,271,299 and 3,342,750 disclose a process for the preparation of alumina-aluminum phosphate gels by reaction of aluminum chloride, phosphoric acid and ethylene oxide.

U.S. Pat. No. 4,080,311 discloses a process for the preparation of thermally stable alumina-aluminum phosphate precipitates having a surface area in the range of 100 to 200 m$^2$/g by mixing an inorganic aluminum salt and phosphoric acid. The mixture is neutralized with ammonia or an ammonium sol to produce the precipitate.

U.S. Pat. No. 4,066,572 discloses a method for the production of a phospha-alumina gel in which an inorganic aluminum salt is mixed with an inorganic phosphorus salt followed by the adjustment of the pH to precipitate the gel.

U.S. Pat. No. 3,879,310 discloses an alumina having a uniformly distributed PO$_4$ content from about 1% to about 20% by weight and a surface area of at least 300 m$^2$/g after heating the composite to 600° C. for 2 hours.

Although high surface area aluminum phosphate-alumina has been prepared by the ethylene or propylene oxide plus aluminum chloride process, the products are difficult to extrude, and the process requires refrigeration. Preparation of aluminum phosphate-alumina by the prior art phosphoric acid-water hydrolysis of aluminum alkoxide yield products of lower surface areas. Attempts to incorporate metals such as molybdenum or tungsten into the alumina-aluminum phosphate prepared by the phosphoric acid procedure usually resulted in a considerable reduction of the surface area of the resulting products.

It has now been found that high surface area aluminum phosphate-alumina can be produced which, when composited with metal components, will have a minimal decrease in surface area.

SUMMARY OF THE INVENTION

An aluminum phosphate-alumina composition prepared by the steps which comprise reacting a mixture comprising an aluminum alkoxide and an organic phosphate having the formula (RO)$_3$PO wherein R is a hydrocarbon radical selected from the group consisting of aryl, alkyl, cycloalkyl, aralkyl, alkary radicals and mixture thereof, in the presence of moist air, to form an aluminum phosphate-alumina precipitate.

The aluminum phosphate alumina compositions can be used alone as catalysts or as supports or components for compositing with kown sorption active components or catalytic components to produce sorbents and catalysts, particularly hydrocarbon treating and conversion catalysts.

BRIEF DESCRIPTION OF THE DRAWING

The FIGURE is a graph showing surface areas of aluminum phosphate-alumina prepared in accordance with the present invention and in accordance with prior art methods.

DETAILED DESCRIPTION OF THE INVENTION

The aluminum phosphate-alumina compositions of the present invention are prepared by mixing an aluminum alkoxide and an organic phosphate of the formula (RO)$_3$PO, wherein R is a hydrocarbon radical selected from the group consisting of alkyl, aryl, cycloalkyl, alkaryl, aralkyl radicals and mixtures thereof. Preferably, the hydrocarbon radical is selected from the group consisting of alkyl and aryl radicals and mixtures thereof. Suitably, the hydrocarbon radical contains from about 1 to about 10 carbon atoms, preferably from about 1 to about 6 carbon atoms. Suitable organic phosphates for use in the mixture include trimethyl phosphate, triethyl phosphate, tributyl phosphate, tricyclohexyl phosphate, triphenyl phosphate, tricresyl phosphate. The trialkyl phosphates are preferred.

The alkoxide constituent of the aluminum alkoxide may be any alkoxide which contains from 1 to 20, preferably from 2 to 5 carbon atoms.

Suitable alkoxides include pentoxides, n-butoxide, secondary butoxide, isobutoxide, isopropoxide, n-propoxide, ethoxide and methoxide. The isopropoxide and secondary butoxide are preferred.

It should be noted that the AlPO$_4$ value is a calculated value based on the phosphorus present (as shown by analysis). X-rays show that most of the phosphorus is in the form of AlPO$_4$. However, in some preparations, the amorphous nature of the product makes identification of the phosphorus species difficult.

The molar ratios of aluminum alkoxide to organic phosphate that are mixed together will depend upon the desired ratio of aluminum phosphate to alumina in the final composition. The molar ratio of the alumina alkoxide to organic phosphate may range from about 10 to 1 to about 0.5 to 1. The resulting mixture is reacted in the presence of moist air at a temperature ranging from about 25° to about 100° C., preferably at a temperature ranging from about 54° to about 60° C. and at atmospheric pressure. If desired, superatmospheric pressures may be used but are not believed to be necessary. After the reaction has produced an aluminum phosphate-alumina precipitate, the mixture may be filtered to recover the precipitate. Note that it may not be necessary to filter the mixture to recover the precipitate since a drying step may evaporate the alcohol medium. The precipitate is then air dried at temperatures ranging from about 25° C. to about 100° C. and calcined at temperatures ranging from about 400° to about 800° C., preferably from about 500° to about 600° C. and atmospheric pressure for a period of about 4 to about 24 hours. The final product is an aluminum phosphate-alumina having a relatively high surface area. The aluminum phosphate in the final product may range from about 10 to about 90 weight percent. Mixed alumina-metal oxide-aluminum phosphate metal phosphates may also be prepared by using a mixture of metal alkoxides. For example, a $SiO_2$-$Al_2O_3$-$AlPO_4$ may be prepared from a mixture of silicon alkoxide (e.g. tetraethyl ortho silicate) and aluminum alkoxide (e.g. aluminum sec-butoxide) by reaction with an organic phosphate (e.g. triethyl phosphate) in the presence of moist air. Metal alkoxides (other than aluminum alkoxide) e.g. titanium tetraisopropoxide, zirconium tetra-normal propoxide, etc. in combination with aluminum alkoxide may also be used to produce mixed metal oxides—metal phosphates. Suitable alkoxide constituents for the additional alkoxide are the same as those defined relative to the aluminum alkoxide. Heteropoly acids of molybdena or tungsten oxides, tungstosilicicacid, molybdosilicic acid, phosphomolybdic acid and the like which are appreciably soluble in organic phosphates may be used as a means of incorporating tungsten oxide, molybdena, etc. along with the heteroatom in the composition of the present invention by dissolving the heteropoly acid in the organic phosphate and reacting with aluminum alkoxide. For example, both silica and tungstic oxide can be introduced into alumina by interaction of silicotungstic acid in triethyl phosphate with aluminum secondary butoxide as shown in Examples 4 and 5. The phosphorus content in the final aluminum phosphate-alumina product may range from about 2 to about 20 weight percent. The surface area referred to herein is measured by the BET method, that is, the nitrogen adsorption method of Brunauer, Emmett and Teller, as shown in Adsorption of Gases in Multi-molecular Layers, J. Am. Chem. Soc., Vol. 60, (1938), pp. 309-319. If desired, the aluminum phosphate-alumina materials of the present invention may be combined with catalytic materials either prior or subsequent to calcination or at any other suitable stage of their preparation.

The aluminum phosphate-alumina materials of the present invention may be used alone as catalysts. Furthermore, the aluminum phosphate-alumina of the present invention may be used as a catalyst component or as catalyst support by compositing it with a catalytic material, for example, with material which funtions as hydrocarbon treating and conversion catalyst for processes such as cracking, hydrocracking, isomerization, polymerization, disproportionation, demetallization, hydrodesulfurization, and desulfurization, etc. Thus, the aluminum phosphate-alumina of the present invention may be composited with known catalytic metals or compounds of metal of Groups IB, IIA, IIB, IIIB, IVA, IVB, VB, VIB, VIIB, VIII and rare earth lanthanide series and mixtures thereof of the Periodic Table of Elements as given in Webster's Seventh Collegiate Dictionary, 1963, C. G. Merriam Co. The catalytically active metals or metal compounds may be combined with the support of the present invention in any conventional way known in the art, such as by deposition, impregnation and at any suitable stage of the preparation of the aluminum phosphate alumina, including before or after calcination of the aluminum phosphate-alumina.

For use in desulfurization and denitrogenation of light and heavy hydrocarbonaceous oils, the alumina-aluminum phosphate composition of the present invention may be combined with 0 to 50, usually 20 to 30 weight percent of any of the metal or metal oxides known to promote hydrorefining reactions such as Group VIB and Group VIII metals of the Periodic Table which include iron, cobalt, nickel, platinum, palladium, ruthenium, rhodium, osmium, iridium, molybdenum, tungsten and chromium.

For use in hydrocracking, the aluminum phosphate-alumina composition of the present invention may be combined with from 0 to 60, usually 10 to 25 weight percent of any of the materials known to promote hydrocracking reactions which include among others nickel oxide, cobalt oxide, molybdenum oxide, tungsten oxide and zeolites, (crystalline and aluminosilicate zeolite). The zeolites may be in the hydrogen or ammonium form or be exchanged with metal ions such as nickel, cobalt, tin, palladium, platinum, and rare earths such as cerium, lanthanum, neodymium, praseodymium, etc.

For use in catalytic cracking, the aluminum phosphatealumina composition of the present invention may be used alone or combined with 0 to 50 weight percent of any of the materials known to promote cracking reactions which include, among others, zinc, titanium, aluminum, zirconium, cadmium, chromium, vanadium, copper and iron; zeolite exchanged with magnesium, hydrogen, chromium, zinc, platinum, palladium, cobalt and iron. The zeolites may be in the hydrogen or ammonium form or may be exchanged with metal ions prior to combining with the aluminum phosphatealumina composition.

For use in reforming, the aluminum phosphate-alumina composition of the present invention may be combined with from 0 to 20, usually 0.1 to 5 weight percent of any of the known metals used to promote reforming catalysts which include among others elements from Groups VIB, VIIB and VIII of the Periodic Table of Elements, such as tungsten, rhenium, ruthenium, iridium, palladium and platinum.

For use in hydrogenation, dehydrogenation, aromatization and oxidation, the aluminum phosphate-alumina composition of the present invention may be combined with from 0 to 50 weight percent of any of the catalytic material known to be useful in the stated processes.

The operating conditions to be employed in the practice of the present invention are well known and vary with the particular conversion reaction desired. Table I summarizes typical reaction conditions effective in the present invention.

TABLE I

| Principal Reaction Desired | Temperature, °F. | Pressure, psig | Feed Rate V/V/Hr. | Hydrogen Rate SCF/bbl. |
|---|---|---|---|---|
| Hydrorefining | 500-800 | 50-2000 | 0.1-10 | 500-10,000 |
| Hydrodesulfurization | 600-850 | 500-3500 | 0.05-5 | 300-20,000 |
| Hydrocracking | 450-850 | 200-2000 | 0.1-10 | 500-10,000 |
| Catalytic Cracking | 700-1200 | 0-50 | 0.1-20 | 0 |
| Catalytic Reforming | 850-1000 | 50-1000 | 0.1-20 | 500-10,000 |

The feedstocks suitable for conversion in accordance with the invention include any of the well known feeds conventionally employed in hydrocarbon treating and conversion processes. The hydrocarbonaceous feed may be derived from any source such as petroleum, shale, tar sand, coal liquefaction products including coal liquefaction bottoms.

PREFERRED EMBODIMENTS

The following examples are presented to illustrate the invention:

EXAMPLE 1

Aluminum phosphate-alumina compositions were prepared by two prior art methods and by the method of the present invention. The physical properties are summarized in Table II.

TABLE II

Physical Properties of $Al_2O_3$-$AlPO_4$
(Products calcined 16 hours @ 1000° F.)

| Preparation Method | Prior Art Ethylene Oxide ($H_3PO_4$) | Prior Art Phosphoric Acid $H_2O$-Mixtures | Present Invention Triethyl Phosphate |
|---|---|---|---|
| Aluminum Cpd. Used | $AlCl_3 6H_2O$ | $Al(OBu)_3$ | $Al(OBu)_3$ |
| Wt. % P as $AlPO_4$ | 40–60 | 45–50 | 45–50 |
| BET Surface Area, $m^2/g$. | 400–600 | 250–400 | 400–600 |
| BET Pore Volume, cc/g. | 0.3–0.8[1] | 1.0–1.5 | 0.5–0.8 |
| MERPOR Pore Volume Distribution | narrow, small pores | Very broad (ca 50% PV in pores 1000 A Diam.) | Intermediate |
| Extrusion | difficult | easily extruded | unknown |

[1]Alcohol extraction of gel is required to obtain the higher pore volume and surface area.

The term "MERPOR" is used herein to designate a mercury penetration method using porosimeter model 915-2 manufactured by Micrometritics Corp., Norcross, GA. The surface tension of the mercury was taken at a contact angle of 140°. A pressure of 50,000 psig was used unless otherwise specified.

EXAMPLE 2

Aluminum sec butoxide (0.55 mols 143 g of 95%) was weighed out into a large evaporating dish. To this was added with stirring 91.0 grams (0.50 mols) of triethyl phosphate. The mixture was allowed to hydrolyse in air for two days with occasional stirring. It was then dried on a steam bath for 8 hours and calcined for 16 hours @1000° F. bringing the temperature up slowly. The initial heating was carried out in a nitrogen atmosphere and when on temperature the nitrogen was cut off and an atmosphere of air substituted. The calcined product had a surface area of 589 $m^2/g$, a pore volume of 0.59 cc/g and a P content of 13.24% (52.17% as $AlPO_4$). The product is in accordance with the present invention.

EXAMPLE 3

Same as Example 2 except that 1/1 mols of aluminum secbutoxide and triethyl phosphate were used. The calcined product had a surface area of 555 $m^2/g$, a pore volume of 0.63 cc/g and a P content of 11.17% (44% as $AlPO_4$). The product is in accordance with the present invention.

EXAMPLE 4

Fifteen grams of tungsto silicic acid (90.3% $WO_3$) was dissolved in 182 grams (1 mol) of triethyl phosphate. This solution (slightly turbid) was added to 260 grams (ca 1 mol) of 95% aluminum secbutoxide with stirring. The mixture was allowed to hydrolyse in air with occasional stirring for four days. After drying, calcining as in Example 2, the calcined product had a surface area of 481 $m^2/g$ and a pore volume of 0.58 cc/g. The P content was 10.41% (41.0% as $AlPO_4$). X-ray diffraction of the calcined product showed no crystallinity (amorphous). The $WO_3$ content by calculation should be approx. 14 percent. This product is in accordance with the present invention.

As can be seen from the above examples, calcined aluminum phosphate-alumina products having high surface areas and comprising large amounts of phosphorus can be produced in accordance with the method of the present invention.

As can be seen from Example 4, 14% $WO_3$ could be composited with the aluminum phosphate-alumina with only a loss of 10% in surface area.

EXAMPLE 5

This was carried out in same manner as Example 4 except that 30 grams of tungsto silicic acid (90.3% $WO_3$) was dissolved in 182 g (1 mol) of triethyl phosphate plus 25 cc of 99% isopropyl alcohol. This did not form a true solution (slightly turbid) but showed no tendency to settle out.

Analysis of the calcined product (calcined 3 hours at 1000° F.) showed 19.75 weight percent tungsten (23.7 wt. % as $WO_3$) and phosphorous 10.62 wt. % or 41.8 wt. % calculated as $AlPO_4$. X-ray examination showed the product to be amorphous. The surface area and pore volume were found to be 386 $m^2/g$ and 0.36 cc/g, respectively. The product is in accordance with the invention.

EXAMPLE 6

Aluminum secbutoxide (260 grams 95% ca 1 mol) was weighed into a large evaporating dish. To this was added 20.0 grams of phosphomolybdic acid dissolved in 182 grams (1 mol) of triethyl phosphate. The mixture thickened and then thinned out again. It was allowed to hydrolyse in moist air for about 72 hours. The product was dried on a steam bath for approximately ten hours and calcined three hours at 1000° F. The calcined product had a surface area of 508 $m^2/g$, a pore volume ($N_2$) of 0.46 cc/g and a pore volume by mercury penetration of 0.46 cc/g. The Mo content by analysis was 10.4 wt. % (15.6 calculated as $MoO_3$) and the P content was 11.09 wt. % or about 44 wt. % calculated as $AlPO_4$. This product is in accordance with the present invention.

EXAMPLE 7

Two hundred and sixty grams of 95% aluminum secbutoxide (about 1 mol) was mixed with 17 grams of tetramethylsilicate (0.11 mol). To this was added with stirring 182 grams (1 mol) of triethylphosphate. The mixture was allowed to hydrolyse in moist air for about 72 hours. After drying on a steam bath for 6 hours, the product was calcined 16 hours at 1000° F. Surface area of the calcined product was found to be 511 m²/g and the pore volume 0.88 cc/g. $SiO_2$ (by analysis) was 6.3 weight percent P (by analysis) was 14.1 weight percent or 55.6 weight percent calculated as $AlPO_4$.

EXAMPLE 8

This example was conducted in the same manner as Example 7 except that the quantity of tetramethylsilicate was doubled (34 grams or 0.22 mol) and tributyl phosphate was used (266 grams or about 1 mol) instead of the triethyl phosphate. After calcining for 16 hours at 1000° F., the product had a surface area of 478 m²/g and a pore volume (BET) of 0.59 cc/g. The $SiO_2$ content was 9.1 weight percent (by analysis) and the phosphorus was 20.4 weight percent or 80.5 weight percent calculated as aluminum phosphate. This product is in accordance with the present invention.

EXAMPLE 9

Two hundred and sixty grams (about 1 mol) of 95 weight percent aluminum sec butoxide were mixed with 118 grams (about 0.25 mol) of tetra-n-propyl zirconate. The mixture thickened initially, then thinned out. To this mixture 91 grams (0.5 mol) of triethyl phosphate was added. The resulting mixture was permitted to hydrolyse in moist air, dried on a steam bath and calcined for 16 hours at 1000° F. The surface area of the calcined product was 394 m²/g. The pore volume was 0.23 cc/g. $ZrO_2$ (by analysis) was 22.06 weight percent P (by analysis) was 5.43 weight percent or 21.4 weight percent calculated as $AlPO_4$. The product was in accordance with the present invention.

EXAMPLE 10

Catalysts were prepared for activity testing of light catalytic cycle oil having an API gravity at 60° F. of 21.9 and having an initial atmosphere pressure boiling point of about 430° F. and a final atmosphere pressure boiling point of about 703° F. sulfur, 1.22 weight percent nitrogen 0.018 weight percent. The hydrotreating conditions used to test each of the catalysts were identical. The catalyst compositions are given in Table III.

TABLE III

| Catalysts | A | B | C | D | E |
|---|---|---|---|---|---|
| Support | $Al_2O_3$-$AlPO_4$ (product of Example 2) | $Al_2O_3$-$AlPO_4$ (product of Example 2) | $SiO_2$-$Al_2O_3$-$AlPO_4$ Cogel by alkylene oxide method of U.S. Pat. No. 3,271,299 | $Al_2O_3$ Commercial product | $Al_2O_3$-$SiO_2$- 2.6% P Commercial product |
| Metals, wt. %[1] | | | | | |
| CoO | 3.5 | — | — | 4.3 | — |
| NiO | — | 3.5 | 3.5 | — | 3.5 |
| $MoO_3$ | 16.6 | 16.6 | 16.6 | 19.2 | 18.0 |

[1] Calculated as the elemental metal based on the total catalyst.

After the catalysts were sulfided in a conventional manner, they were used in the hydrotreating experiments each at 600° F., feed rate of 2 V/Hr/V, 1000 SCF $H_2$/bbl gas rate, at 450 and at 800 psig using the given light cycle oil feed. The results are summarized in Table IV.

TABLE IV

| Pressure Catalyst | Reaction Rate Constant | | | |
|---|---|---|---|---|
| | Sulfur 1.5 order | | Nitrogen 1st order | |
| | 450 psig | 800 psig | 450 psig | 800 psig |
| A | 6.3 | 6.9 | 2.6 | 4.4 |
| B | 4.3 | 4.4 | 2.3 | 5.2 |
| C | 3.5 | 4.1 | 3.3 | 5.2 |
| D | 7.6 | 8.6 | 1.8 | 3.5 |
| E | 4.6 | 4.8 | 2.3 | 4.0 |

EXAMPLE 11

Silica-aluminum-aluminum phosphate supports were impregnated with cobalt-nickel and molybdenum and tested for their hydrotreating activity using a model compound synthetic feed having the composition shown in Table V.

TABLE V

| Component | Weight Percent |
|---|---|
| Tetralin | 75 |
| Dibenzothiophene | 15 |
| Methylnaphthalene | 6 |
| Acridine | 4 |

The aluminum phosphate supports are described in Table VI.

TABLE VI

| Catalyst | F | G |
|---|---|---|
| Support | $SiO_2$ (15%) $Al_2O_3$ (28%) $AlPO_4$ (57%) | $SiO_2$ (6%) $Al_2O_3$ (38%) $AlPO_4$ (56%) |
| Support preparation | U.S. Pat. No. 3,904,550 | Example 7 of this application |
| Metals, wt. %[1] | | |
| CoO | 2 | 2 |
| NiO | 2 | 2 |
| $MoO_3$ | 15.5 | 15.5 |

[1] Calculated as the elemental metal based on the total catalyst.

After sulfiding, the catalysts were tested in a small laboratory unit at the following process conditions: temperature of 700° F., feed rate 1 V/Hr/V; a pressure of 500 psig; $H_2$ gas rate of 2000 SCF $H_2$/bbl feed.

The activity data are summarized in Table VII.

TABLE VII

| Catalyst | 1.5 order | Reaction Rate Constant | |
|---|---|---|---|
| | | Sulfur 1st order | Nitrogen |
| F | | 0.60 | 0.11 |
| G | | 2.60 | 0.15 |
| H | Ni-Mo on $SiO_2$ $Al_2O_3$ (commercial) | 2.45 | 0.29 |

What is claimed is:

1. An aluminum phosphate-alumina composition prepared by the steps which comprise reacting a mixture comprising an aluminum alkoxide and an organic phosphate having the formula (RO)$_3$PO wherein R is a hydrocarbon radical selected from the group consisting of alkyl, aryl, cycloalkyl, alkaryl, aralkyl radicals and mixtures thereof, in the presence of moist air, to form an aluminum phosphate-alumina precipitate, and separating said aluminum phosphate-alumina precipitate from said mixture.

2. The composition of claim 1 wherein R contains from 1 to 20 carbon atoms.

3. The composition of claim 1 wherein said aluminum phosphate-alumina composition comprises about 50 weight percent alumina and about 50 weight percent aluminum phosphate and wherein said composition has a surface area ranging from about 550 to about 600 m$^2$/g.

4. The composition of claim 1 wherein said aluminum phosphate-alumina composition comprises from about 10 to about 90 weight percent aluminum phosphate.

5. The composition of claim 1 wherein the molar ratio of said aluminum alkoxide to said organic phosphate ranges from about 10:1 to about 0.5:1.

6. The composition of claim 1 wherein the molar ratio of said aluminum alkoxide to said organic phosphate is about 1:1.

7. The composition of claim 1 wherein said reaction is conducted at temperature ranging from about 25° to about 100° C.

8. The composition of claim 1 wherein the alkoxide constituent of said aluminum alkoxide is selected from the group consisting of C$_1$ to C$_{20}$ alkoxides.

9. The composition of claim 1 wherein said separated precipitate is calcined.

10. The composition of claim 9 wherein said calcination is conducted at a temperature ranging from about 400° to about 800° C.

11. The composition of claim 9 wherein prior to said calcination, said precipitate is air dried.

12. The composition of claim 1 wherein said mixture comprises an added alkoxide of an element other than aluminum.

13. The composition of claim 12, wherein said added alkoxide is selected from the group consisting of silicon alkoxide, zirconium alkoxide, titanium alkoxide and mixtures thereof.

14. A catalyst comprising a metal component selected from the group consisting of Group IB, Group IIA, Group IIB, Group IVA, Group IVB, Group VIIB, Group VIII and mixtures thereof from the Periodic Table of Elements composited with an aluminum phosphate-alumina composition prepared by the steps which comprise reacting a mixture comprising an aluminum alkoxide and an organic phosphate having the formula (RO)$_3$PO wherein R is a hydrocarbon radical selected from the group consisting of alkyl, aryl, cycloalkyl, aralkyl, alkaryl radicals and mixtures thereof, in the presence of moist air to form an aluminum phosphate-alumina precipitate.

15. The catalyst of claim 14 wherein said R contains from 1 to 20 carbon atoms.

16. The catalyst of claim 14 wherein said aluminum phosphate-alumina composition comprises from about 50 weight percent alumina and from about 50 weight percent aluminum phosphate and wherein said composition has a surface area ranging from about 550 to about 600 m$^2$/g prior to being composited with said metal component.

17. The catalyst of claim 14 wherein said aluminum phosphate-alumina composition comprises from about 10 to about 90 percent aluminum phosphate.

18. The catalyst of claim 14 wherein the molar ratio of said aluminum alkoxide to said organic phosphate ranges from about 10:1 to about 0.5:1.

19. The catalyst of claim 14 wherein the molar ratio of said aluminum alkoxide to said organic phosphate is about 1:1.

20. The catalyst of claim 14 wherein said reaction is conducted at a temperature ranging from about 25° to about 100° C.

21. The catalyst of claim 14 wherein the alkoxide constituent of said aluminum alkoxide is selected from the group consisting of C$_1$ to C$_{20}$ alkoxides.

22. The catalyst of claim 14 wherein said aluminum phosphate-alumina precipitate is separated from said mixture and wherein the separated precipitate is calcined.

23. The catalyst of claim 22 wherein said calcination is conducted at a temperature ranging from about 400° to about 800° C.

24. The catalyst of claim 22 wherein prior to said calcination step, said precipitate is air dried.

25. The catalyst of claim 14 wherein said mixture comprises an added alkoxide of an element other than aluminum.

26. The catalyst of claim 25 wherein said added alkoxide is selected from the group consisting of silicon alkoxide, zirconium alkoxide, titanium alkoxide and mixtures thereof.

* * * * *